Jan. 11, 1966   W. A. BOOTHE   3,228,602
FLUID-OPERATED ERROR DETECTING AND INDICATING CIRCUIT
Filed May 28, 1964   3 Sheets-Sheet 1

Inventor
Willis A. Boothe
by Paul A. Frank
His Attorney

United States Patent Office

3,228,602
Patented Jan. 11, 1966

3,228,602
FLUID-OPERATED ERROR DETECTING AND
INDICATING CIRCUIT
Willis A. Boothe, Scotia, N.Y., assignor to General Electric Company, a corporation of New York
Filed May 28, 1964, Ser. No. 370,922
10 Claims. (Cl. 235—201)

This invention relates to error-detecting and indicating circuits and, more particularly, to fluid-operated error-detecting and indicating circuits.

There are innumerable instances in all phases of technology wherein it is required that a selected condition be monitored to determine its value and that means be provided for comparing the actual value, as monitored, with the desired value thereof, as provided by a reference source, to determine the magnitude of the error. It is also desirable that means be provided for indicating whether the magnitude of the error, termed the error status, of the selected condition is within or without predetermined tolerances or permissible error limits. Illustratively, the selected condition may be the height of liquid, or the liquid level, within an enclosed container, or the pressure or temperature of a gas or liquid; similarly, the selected condition of a mechanical system may comprise the magnitude of a rotational velocity. In effect, the selected condition may comprise any function or condition which may be sensed for measurement by a suitable transducer means to provide a signal or other indication which may be compared with a reference signal.

Frequently, the region in which the selected condition is to be monitored introduces extreme environmental problems, such as shock, vibration, and high temperature. Prior art systems, particularly those comprising electronic elements, are incapable of withstanding such extreme environmental conditions. Thus, in the past, it has been necessary to monitor, or to sense, the selected condition with an appropriate transducer and to transmit the output indication of the transducer means to a remote position for performing further functions therewith, such as for comparing the transducer output indication with a reference signal to determine the magnitude of the error. Such transmission, particularly where the transducer output signal is an analogue representation of the sensed condition, introduces a loss of accuracy in the error indication due to attenuation of the signal and nonlinearities and disturbances present in the transmission system.

Fluid control devices, as employed in a fluid-operated error-detecting and indicating system constructed in accordance with my invention, are relatively insensitive to shock, vibration, and temperature effects. Thus, the fluid-operated error-detecting and indicating system of my invention may be positioned directly in the region of the selected condition to be monitored, despite the environmental extremes. Further, the system may perform a logic function upon sensor signals applied thereto which are representative of the selected condition and generate in response thereto first and second output fluid waves indicating, respectively, the status of the sensed condition as within or without a predetermined range of permissible error limits. Since the first and second output fluid waves are essentially digital in character, inaccuracies introduced therein during the transmission of the output waves to a remote point due to attenuation, nonlinearities, and other disturbances are relatively inconsequential and do not affect the accuracy of the indication.

Whereas the mechanical, mechanical-electrical, or purely electrical prior art circuits employ a substantial number of relatively expensive, complex components, the fluid control devices employed in the system of my invention are relatively inexpensive and simple to construct. Fluid control devices may be formed from any material which is nonporous and has structural rigidity, thereby offering a wide range of materials which may be selected in accordance with the environment to which the devices are contemplated to be subjected. Further, the fluid control devices are highly accurate and provide a substantially unlimited life span in operation since they employ neither parts subject to frictional wear nor parts subject to self-deterioration, such as a cathode in an electron tube.

In addition to the stability, reliability, and low cost of the fluid control devices, they are readily adaptable for employment in error-indicating and detecting systems. Illustratively, in a temperature-sensing system, the ambient air in the region of the selected condition also may be employed as the fluid medium in a fluid oscillator, the output frequency of which varies as a predetermined function of the temperature of the fluid medium employed therein.

Therefore, it is an object of this invention to provide an error-detecting and indicating circuit employing fluid as the operating medium.

Another object of this invention is to provide a fluid-operated error-detecting and indicating system which may be positioned at the region of the sensed condition.

It is another object of this invention to provide a fluid-operated error-detecting and indicating system which operates accurately and efficiently under extreme environmental conditions.

A further object of this invention is to provide fluid-operated error-detecting and indicating circuit employing a minimum number of components.

It is a further object of this invention to provide a fluid-operated error-detecting and indicating circuit which is low in cost of components and construction and which is highly reliable and accurate in operation and of an essentially unlimited life span.

In accordance with a preferred embodiment of the invention, a fluid sensor means is provided for monitoring a selected condition and generating an output fluid wave in response thereto having a characteristic varied in accordance with the monitored value of the selected condition. There is further provided a fluid reference means for generating a reference fluid wave of a fixed characteristic representing the desired value of the selected condition. The reference and the sensor fluid waves are applied to a fluid-detecting means which generates in response thereto an error fluid wave having a characteristic varied to represent the difference between the desired and the monitored values of the selected condition. The reference fluid wave is also applied to a first fluid control means which operates, in response thereto, to determine a measuring interval of permissible error limits; similarly, the error fluid wave is applied to a second fluid control means which measures the magnitude of error occurring within each measuring interval and which operates, in response thereto, to determine the permissible error limits within a given measuring interval. Both the first and the second fluid control means produce an output fluid pulse upon completion of their respective operating cycles, the output fluid pulses being applied to both a reset fluid control means and a status-indicating fluid control means. The status-indicating fluid control means responds to the output fluid pulse first received from either the first or the second fluid control means for generating in response thereto, first and second output fluid waves indicating, respectively, the error status of the selected condition as being within or without the permissible error limits. The reset fluid control means respond to the same output fluid pulse to generate a reset fluid pulse for resetting both the first and the second fluid control means for initiating their operation in a subsequent measuring interval.

For a better understanding of the invention, reference may be had to the following drawings in which.

Figure 1:
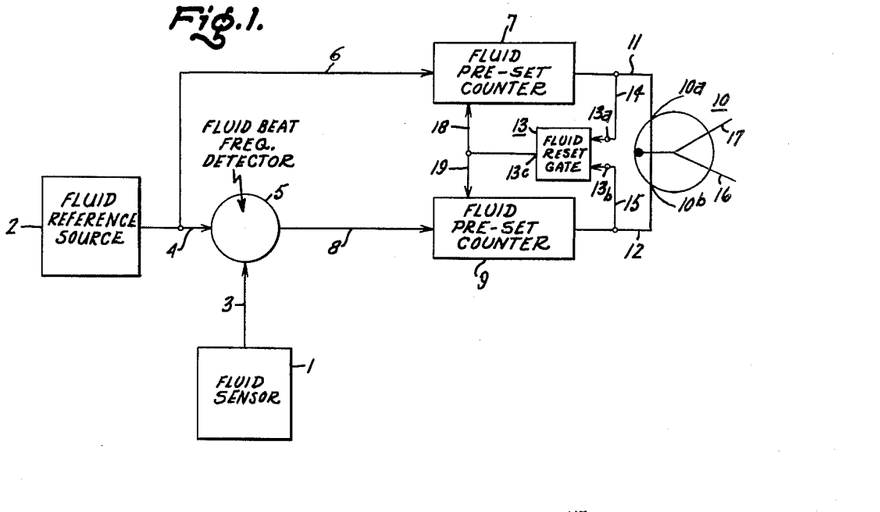
FIGURE 1 is a block diagram of a fluid-operated error-detecting and indicating circuit constructed in accordance with my invention.

The operation and general configuration of my fluid-operated error-detecting and indicating circuit will first be briefly described with relation to the block diagram of FIGURE 1.

In FIGURE 1, a fluid sensor 1 monitors a selected condition and generates in response thereto a sensor fluid wave varied in frequency in accordance with the monitored value of the selected condition. As heretofore described and for purposes of illustration only, the selected condition may be the pressure or temperature of a gas or liquid, or, in a mechanical system the magnitude of a rotational velocity. A fluid reference source 2 generates a reference fluid wave preferably of square wave pulses, controlled at a fixed frequency in accordance with the desired value of the selected condition. The function representing the sensor and reference fluid waves is indicated by lines 3 and 4, respectively, it being understood that lines 3 and 4 may each represent a single conduit or pair of conduits if push-pull circuitry is used. The sensor and reference fluid waves are supplied to a fluid beat frequency detector 5 which performs a heterodyning function and generates an error fluid wave of square wave pulses varied in frequency in accordance with the difference-frequency of the sensor and reference fluid waves. The error fluid wave, therefore, represents the difference between the monitored, or actual, value and the desired value of the selected condition. The reference fluid wave is supplied also through line 6 to a first inlet of a first fluid preset counter 7, the latter being preset to generate an output pulse in response to the reception of a predetermined number of fluid pulses from the fixed frequency reference fluid wave, thereby determining a measuring interval of a desired time duration. Similarly, the error fluid wave is supplied through line 8 to a first inlet of a second fluid preset counter 9, the latter being preset to generate an output fluid pulse in response to the reception of a predetermined number of fluid pulses from the error fluid wave, thereby determining the permissible error limits or tolerance within a given measuring interval. As mentioned above with reference to lines 3 and 4, lines 7 and 8 may also each represent a single or pair of conduits.

A fluid status indicator 10 communicates at its control fluid inlets 10a and 10b through lines 11 and 12 with the outputs of the counters 7 and 9, respectively. A fluid reset gate 13 likewise communicates at its inlets 13a and 13b with the outputs of the counters 7 and 9 through the lines 14 and 15, respectively. The fluid status indicator 10 includes first and second outlets 16 and 17. The fluid reset gate 13 includes a single outlet 13c communicating through lines 18 and 19 with second inlets of the fluid preset counters 7 and 9, respectively.

The counters 7 and 9 are controlled to initiate counting simultaneously, each responding to its respectively associated input fluid wave and providing an output fluid pulse upon reception of the appropriate number of input fluid pulses.

If the error status is within the permissible error limits, counter 7 will complete its count prior to counter 9. The counter 7 will then produce an output pulse which is supplied through line 11 to fluid status indicator 10, the latter generating a first output fluid wave at the outlet 16 thereof indicating the status of the selected condition as within the permissible error limits. The output pulse from counter 7 is supplied simultaneously through line 14 to fluid reset gate 13 which generates, in response thereto, a reset fluid pulse. The reset fluid pulse is supplied through lines 18 and 19 to the second inputs of the fluid preset counters 7 and 9, respectively, to terminate the present counting cycle and initiate operation of the counters 7 and 9 in a subsequent measuring interval.

The alternative situation is established when fluid preset counter 9 receives a number of pulses from the error fluid wave on line 8 causing it to reach its predetermined count prior to counter 7. In this instance, counter 9 produces an output fluid pulse which is supplied through line 12 to error status indicator 10, the latter generating in response thereto a second output fluid wave at its outlet 17 indicating the error status of the selected condition as without the permissible error limits. The output fluid pulse from preset counter 9 is supplied simultaneously through line 15 to fluid reset gate 13 which, as hereinbefore explained, responds thereto to generate a reset fluid pulse for terminating the present counting cycle and for initiating operation of counters 7 and 9 in a subsequent measuring interval.

The first and second output fluid waves provide the error indication in digital fashion. Thus, the error status indication provided by the output waves may be transmitted to a remote position, the accuracy of the indication at the remote position being substantially unaffected by attenuation of the ouput fluid waves during the transmission of nonlinearities or other disturbances present in the transmission system due to the digital nature of the error status indication.

Physical diagrammatic representations of certain basic types of fluid control devices employed in the invention are shown in FIGURES 2–5 and discussed with reference thereto for facilitating an explanation of the detailed schematic form of the fluid-operated error-detecting and indicating circuit of the invention shown in FIGURE 7.

Figure 2:
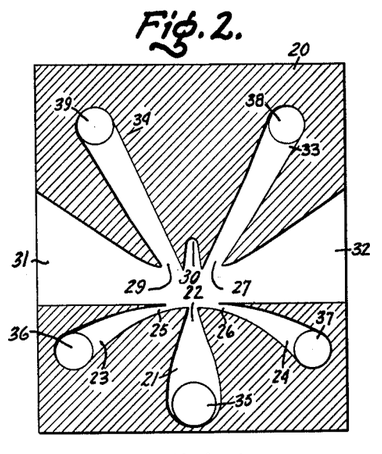
FIGURES 2–5 are physical diagrammatic representations of various fluid control devices suitable for employment in the fluid-operated error-detecting and indicating circuit of the invention.

In FIGURE 2 there is shown a physical diagrammatic representation of a momentum exchange type of fluid control device, commonly referred to as an analogue fluid amplifier. A base member 20 in which the device is formed may be selected from virtually any material that is nonporous, has structural rigidity, and is nonreactive with the fluid medium employed. Illustratively, various plastics may be employed quite advantageously for this purpose, such materials permitting low temperature molding to form the interior channels and passages for the fluid medium. Alternatively, materials adaptable to photoetching processes may be employed, facilitating mass production of the fluid control devices. In addition, metal and other material of a more durable nature may be employed and may be slotted or molded to the desired configuration. A face plate (not shown) is positioned over the base member 20, enclosing various channels and passages to confine the fluid therein; if desired, the face plate may be a transparent material to permit interior inspection of the device. Alternatively, the channels and passages may pass completely through the base member 20 and a face plate provided on both sides thereof. The fluid medium employed may be a compressible fluid such as gases, including air, and relatively incompressible fluids such as water or oil.

The analogue amplifier shown in FIGURE 2 includes a power fluid inlet 21 terminating in a fluid flow restrictor forming a nozzle 22 for forming power fluid received therein into a power jet. Control fluid inlets 23 and 24 are provided, terminating in nozzles 25 and 26, respectively, for forming control fluid received therein into control jets directed against the opposite sides of the power jet. Power fluid passage 27 operates as a receiver for receiving the flow of power fluid from the power jet when the latter is deflected by a control jet from nozzle 25. Power flow passage 29 likewise acts as a receiver for receiving the flow of power fluid from the power jet following deflection thereof by a control jet from nozzle 26. The power flow passages 27 and 29 terminating in power fluid outlets 33 and 34, respectively, also provide power fluid outputs from the analogue fluid amplifier at which there are produced push-pull or complementary output fluid waves. The analogue fluid amplifier of FIGURE 2 derives its nomenclature from the proportional increases and decreases effected in the flows of power fluid in power flow passages 27 and 29, one relative to the other, in response to the increases and decreases in the relative magnitudes of the control jets from nozzles 25 and 26, respectively. Although the magnitude of the fluid flow in the control jets is small relative to the flow in the power jet, the transverse direction of impingement of the control jets on the power jet effects the deflection thereof. Thus, the analogue fluid amplifier provides gain, the change in flows of output power fluid being of increased magnitude relative to the change in flows of the control fluid. Indentation 30 provided intermediate the power flow passages 27 and 29 may be used for venting. Vents 31 and 32 are also provided to equalize ambient pressures on the opposite sides of the jet and to remove excess fluid from the deflection region.

The power fluid inlet 21, control fluid inlets 23 and 24, and power fluid outlets 33 and 34 may be provided, respectively, with conduits 35–39 for interconnection of the respectively associated passages and inlets with other portions of a fluid control system. The conduits 35–39 are represented by circular elements in FIGURE 2 and, illustratively, they comprise cylindrical conduits vertically positioned relative to the plane of the base member 20. Alternatively, slots or channels may be provided in the base member 20 extending to the periphery thereof whereby communication with the various passageways may be had by connection of conduits or other channel-defining members to the peripheral boundaries of the base member 20. The conduits 35–39 may extend vertically to the plane of the fluid control device for a short distance and then are provided with right angle turns to facilitate vertical stacking of two or more of the fluid control devices.

Figure 3:
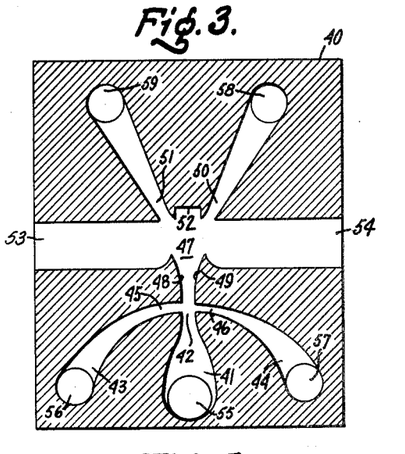

A digital fluid amplifier is shown in FIGURE 3. A base member 40 is selected from materials with regard to the same considerations as the base member 20 in FIGURE 2 and the digital fluid control device is formed therein in accordance with the same manufacturing techniques. A power fluid inlet 41 is provided, terminating in nozzle 42 for forming power fluid received therein into a power jet. There are further provided control fluid inlets 43 and 44 terminating in nozzles 45 and 46, respectively, for forming control fluid received therein into control jets directed against opposite sides of the power jet.

The control jets deflect the power jet within interaction chamber 47, the latter being defined by a pair of oppositely disposed side walls 48 and 49 which diverge in the direction of the fluid flow in the power jet. The side walls may be designed to obtain momentum exchange or boundary layer action. Since momentum exchange has been explained with reference to the analogue amplifier of FIGURE 2, it will not be explained again with reference to the digital amplifier. Thus, only boundary layer action will be explained for the digital-type fluid amplifier although it is to be understood that such amplifier is also operable by momentum exchange with proper design of the interaction chamber side walls. Power flow passages 50 and 51 serve as receivers for receiving the flow of power fluid from the power jet following an appropriate deflection thereof and the terminal ends thereof provide power fluid outlets. Indentation 52, provided intermediate the power flow passages 50 and 51, enhances the deflection of the power jet. Vents 53 and 54 are provided to remove excess fluid from the interaction chamber 47.

In operation, the power jet undergoes an entrainment action with the side walls 48 and 49 creating a low pressure region of trapped fluid between the sides of the power jet and the side walls 48 and 49. The side walls 48 and 49 are designed such that, due to inherent imbalances in the forces acting on the power jet, it will become attached to one or the other but not both of the side walls 48 and 49.

The entrainment action is regenerative in effect, the low pressure region of trapped fluid causing the power jet to be deflected more closely to a given one of the side walls 48 and 49 whereby the entrainment action increases in magnitude, effecting a resultant decrease in the pressure of the region of trapped fluid. In this manner, the power jet achieves a stable position of attachment to a given one of the side walls 48 and 49 for a substantial distance along the length thereof. The descriptive terminology of a boundary layer effect type of fluid control device thus arises from the attachment which the power jet experiences with the side walls 48 and 49.

The boundary layer effect type of fluid control device is also referred to as a digital fluid control device in that, when in one of the attached portions, the flow of power fluid is confined almost exclusively to the corresponding one of the power flow passages 50 and 51. Indentation 52, by imparting a vortex flow to the power jet, not only enhances the deflection thereof but also compacts the fluid flow therein to provide the substantially exclusive flow of power fluid within one or the other of the power flow passages 50 and 51. Illustratively, when the power jet is attached to side wall 48, a substantially exclusive flow of power fluid will be created in power flow passage 51, to the exclusion of flow in power flow passage 50.

To switch the power jet for creating a flow of power fluid in power flow passage 50, a control jet from nozzle 45 is formed and directed against the power jet. The control fluid introduced by the control jet increases the pressure in the region of trapped fluid intermediate the power jet and side wall 48 and overcomes the entrainment action, progressively detaching the power jet from side wall 48. The control jet further acts to deflect the power jet toward side wall 49 to which it subsequently becomes attached by the entrainment process. Thus, there is created a flow of power fluid in power flow passage 50, substantially to the exclusion of power flow passage 51. Indentation 52 serves to impart a vortex action to the flow, thereby both enhancing the deflection and assisting in creating the exclusive flow of power fluid. By directing a control jet from nozzle 46 against the power jet when the latter is attached to side wall 49, the power jet may be detached from side wall 49 and deflected to effect a subsequent attachment to side wall 48, thereby switching the exclusive flow of power fluid to power flow passage 51. Hence, the output fluid waves created by the flows of power fluid in power flow passages 50 and 51 are of a push-pull or complementary nature and, due to the rapid switching therebetween, are substantially of square wave forms.

As explained with reference to the device of FIGURE 2, the digital fluid control device of FIGURE 3 may be provided with vertical conduits 55 to 59 or, if desired, channels formed within and extending to the periphery of the base member 40 to provide communication with, respectively, power fluid inlet 41, control fluid inlets 43 and 44, and power flow passages 50 and 51.

Figure 4:
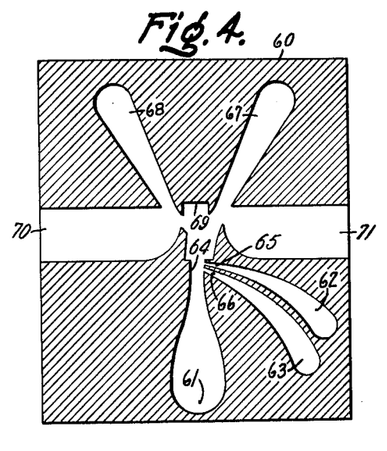

In FIGURE 4 is shown a physical diagrammatic representation of a fluid control device constituting a modification of the more basic fluid control devices shown in FIGURES 2 and 3. The device of FIGURE 4 is monostable in operation, and is a digital fluid control device generating output fluid waves having a square wave form. The monostable fluid digital fluid control device is formed in a base member 60, the material of the latter being selected in accordance with the considerations hereinbefore set forth.

The monostable digital fluid control device includes a power fluid inlet 61 and first and second control fluid inlets 62 and 63, the former terminating in a nozzle 64 for forming power fluid received therein into a power fluid jet and the latter terminating in nozzles 65 and 66, respectively, for forming control fluid received therein into control fluid jets directed against the same side of the power jet. In the absence of a control jet from either nozzle 65 or nozzle 66, the power jet from nozzle 64 is directed to be normally received within a first power flow passage 67, the latter acting as a receiver for receiving the flow of power fluid from the power jet and also providing a first power fluid outlet for the device.

A second power flow passage 68 is provided which acts as a receiver for receiving the flow of power fluid from the power jet following the deflection of the latter by a control jet from either or both of the nozzles 65 and 66. Power flow passage 68 also provides a second power fluid outlet for the device. Indentation 69, provided intermediate the first and second power flow passages 67 and 68, imparts a vortex action to the power jet to enhance the deflection thereof and to compact the fluid therein to create substantially exclusive flows of power fluid in the selected one of the power flow passages 67 and 68 to which the power jet is deflected. There are further provided vents 70 and 71 to provide passages for removing excess fluid from the region of deflection of the power jet. It is to be understood that the fluid inlets and outlets may be provided with vertical conduits (not shown) for interconnection of such elements with other portions of a fluid control system, as shown in FIGURES 2 and 3.

The monostable digital fluid control device of FIGURE 4 performs a logic OR function with respect to the input fluid waves applied to the control fluid inlets 62 and 63. As noted, in the absence of a control jet from either nozzle 65 or 66, the power jet undergoes a normal deflection for creating a flow of power fluid in power flow passage 67. A control jet from either nozzle 65 or nozzle 66 or control jets from both nozzles 65 and 66 serve to deflect the power jet, thereby creating a flow of power fluid in power flow passage 68. The output fluid waves, constituting the flows of power fluid in power flow passages 67 and 68, therefore are push-pull or complementary and of square wave form, representing a logic OR function relating to the input fluid waves applied to control fluid inlets 62 and 63.

Figure 5:
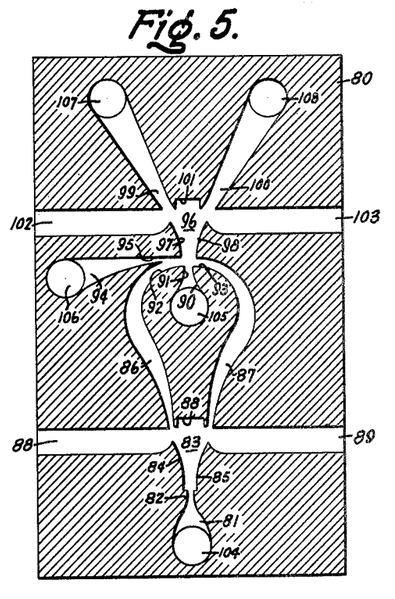

In FIGURE 5 there is shown a physical diagrammatic representation of a known digital fluid control device performing a binary flip-flop or switching function. The binary flip-flop digital fluid control device of FIGURE 5 is formed in a base member 80 in accordance with considerations hereinbefore set forth. A first control fluid inlet 81 is provided to which an input fluid wave comprising a train of successive pulses is applied, each pulse of the input fluid wave effecting a switching of the device. Control fluid inlet 81 terminates in nozzle 82 for forming the control fluid received therein into a control fluid jet. The control jet proceeds into interaction chamber 83 which is bounded on opposite sides by a pair of diverging side walls 84 and 85. In a manner hereinafter described, the control jet from control nozzle 82 is alternately deflected within interaction chamber 83 for producing a flow of fluid in one or other of the control flow passages 86 and 87. Indentation 88 provided intermediate the control flow passages 86 and 87 imparts a vortex action to the control jet to enhance the deflection thereof and to compact the fluid flow therein into the selected one of the control flow passages 86 and 87 toward which it has been deflected. Vents 88 and 89 are provided for removing excess fluid from the interaction chamber 83.

A power fluid inlet 90 is provided, terminating in nozzle 91 for forming power fluid received therein into a power jet. The control flow passages 86 and 87 terminate in nozzles 92 and 93, respectively, for forming the control fluid flow created therein by a corresponding deflection of the control jet from nozzle 82 into control jets directed against opposite sides of the power jet from nozzle 91. Additionally, there is provided a control fluid inlet 94 terminating in nozzle 95 for forming control fluid received therein from an external control source into a control jet directed against the same side of the power jet as the control jet from nozzle 92.

The power jet proceeds from nozzle 91 into interaction chamber 96, the latter being defined by a pair of oppositely disposed diverging side walls 97 and 98. The power jet becomes attached to one or the other of the side walls 97 and 98 through the entrainment process, as explained with regard to the boundary layer effect digital fluid control device in FIGURE 3. Thus, when the power jet is attached to side wall 97, a substantially exclusive flow of power fluid is created in power flow passage 99, the latter acting as a receiver for receiving the flow of power fluid from the power jet; similarly, a substantially exclusive flow of power fluid is created in power flow passage 100 when the power jet is attached to the side wall 98. Indentation 101, provided intermediate the power flow passages 99 and 100, imparts a vortex action to the power jet to enhance the deflection thereof and to compact the fluid flow therein into the selected one of the power flow passages 99 and 100 toward which it has been deflected. Vents 102 and 103 are provided for removing excess fluid from the interaction chamber 96. Conduits 104–108 may be employed to provide communication of the various fluid inlets and outlets 81, 90, 94, 99, and 100, respectively, with other portions of a fluid control system. Alternatively, other interconnection techniques may be employed, as hereinbefore explained.

In operation, a source of power fluid is continuously applied to power fluid inlet 90 whereby a power jet exists at all times within interaction chamber 96. Although the power jet will inherently become attached to one or the other of the side walls 97 and 98, in many applications it is essential that means be provided to assure that the power jet is attached to a selected one thereof. Thus, a suitable timing or reset fluid wave is applied to control fluid inlet 94 and formed by control nozzle 95 into a reset control jet. The reset control jet operates to deflect the power jet to an initial position of attachment to side wall 98, thereby creating a flow of power fluid in power flow passage 100. Where it is required that the power jet be controlled for effecting an initial position of attachment to side wall 97, it is apparent that a suitable reset control fluid inlet and associated nozzle may be formed on the side opposite to that of the inlet 94 and nozzle 95 for creating a control jet to effect an initial deflection and resultant attachment of the power jet to side wall 97.

Assuming the power jet to be initially attached to side wall 98, the flip-flop or switching action of the device of FIGURE 5 commences upon the application of an input fluid wave, such as a train of fluid pulses, to the control fluid inlet 81. The deflection of the control jet from nozzle 82 within interaction chamber 83 is effected in accordance with the position of attachment of the power jet within interaction chamber 96. Illustratively, assuming an initial position of attachment of the power jet to side wall 98, the entrainment action creates a low pressure region of trapped fluid at the control nozzle 93 of control flow passage 87. The fluid at control nozzle 93 and within the control flow passage 87 is therefore relatively lower in pressure than that at the control nozzle 92 and within control flow passage 86.

The power jet from nozzle 91 may be analogized as creating an alternating pneumatic potential source, switching in polarity depending on its alternating positions of attachment to the side walls 97 and 98. Illustratively, when the power jet is attached to side wall 98, the pneumatic potential gradient passes in a counterclockwise path from a high pneumatic potential at control nozzle 92 and through the control flow passage 86, interaction chamber 83, and control flow passage 87 to return to a relatively lower pneumatic potential at control nozzle 93. For this state of attachment of the power jet, there exists a pneumatic potential gradient within interaction chamber 83 acting to deflect the control jet received therein from nozzle 82 for reception within control flow passage 87. The control jet from nozzle 82 undergoes attachment with the side wall 85 through the entrainment process to create a substantially exclusive flow of control fluid in control flow passage 87. This flow of control fluid in control flow passage 87 is formed into a control jet at the nozzle 93 and directed against the power jet within interaction chamber 96 to detach it from the side wall 98 and deflect it for subsequent attachment to the side wall 97. As a result, the flow of power fluid is switched from power flow passage 100 to power flow passage 99.

When the power jet from nozzle 91 becomes attached to the side wall 97, the pneumatic potential gradient is established in an opposite direction between the nozzles 92 and 93, then extending in clockwise fashion from a high pneumatic potential at control nozzle 93 and through control flow passage 87, interaction chamber 83, and control flow passage 86 to return to the relatively lower pneumatic potential at control nozzle 92. Thus, a subsequent control pulse from the control fluid wave applied to control fluid inlet 81 is formed into a control jet by control nozzle 82 and deflected within interaction chamber 83 for reception within control flow passage 86. The flow of control fluid created within control flow passage 86 in this manner is further formed into a control jet at nozzle 92 and directed against the power jet. The power jet thus is detached from side wall 97 and deflected for initiating subsequent attachment to side wall 98, switching the flow of power fluid from power flow passage 99 to power flow passage 100.

Thus, a flow of power fluid is created in an alternating fashion between power flow passages 99 and 100 in response to successive pulses in a fluid pulse train comprising the input fluid wave applied to the control fluid inlet 81.

Figure 6:
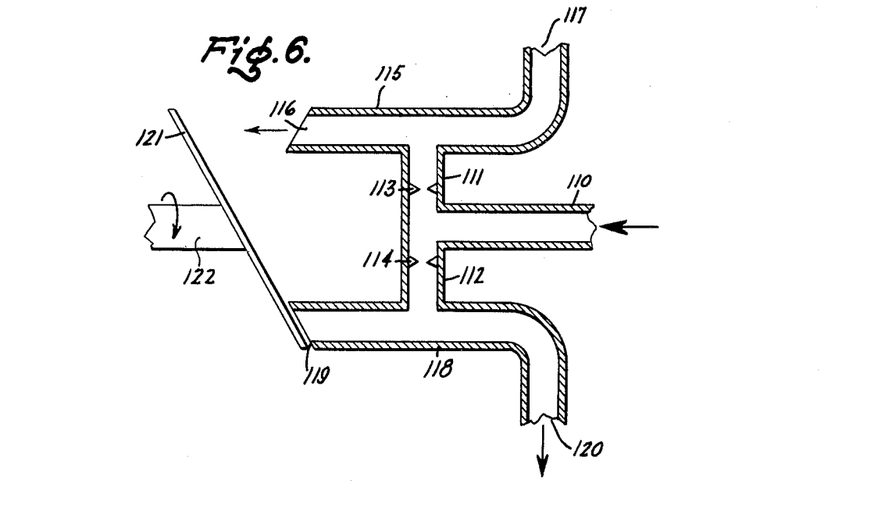
FIGURE 6 is a physical diagrammatic representation of a reference frequency fluid wave source for use in the error-detecting and indicating circuit of the invention.

In FIGURE 6 there is shown a fluid-mechanical mechanism for producing reference fluid waves having fixed frequency. A continuous source of power fluid is supplied to inlet pipe 110 and divided to pass as first and second flows of power fluid through the pipes 111 and 112, the latter being provided with fluid flow restrictors 113 and 114, respectively. Pipe 111 communicates with a delivery pipe 115, the latter having a first open end comprising a control port 116 and a second, or delivery end 117 provided for communication with utilization apparatus. Pipe 112 similarly communicates with delivery pipe 118, the latter being provided with a first open end comprising a control port 119 and a second, or delivery end 120 provided for communication with utilization apparatus.

In operation, a wobble plate 121, mounted in an angularly displaced manner on shaft 122, is rotated at an accurately controlled rotational velocity such as by a synchronous motor (not shown). For the position of the wobble plate 121 shown in FIGURE 6, control port 119 is closed off, thereby causing a flow of power fluid at the delivery end 120 of the delivery pipe 118. Since the control port 116 is open at this time, the flow of power fluid in pipe 115 freely passes therethrough. Due to back-pressures developed at delivery end 117 from the utilization apparatus with which it is in communication, little or no power fluid will pass therethrough. As wobble plate 121 is rotated, control port 116 is closed off and control port 119 opened, thereby effecting a flow of power fluid at delivery end 117 of the pipe 115. As hereinbefore explained, back-pressure from the utilization apparatus will substantially terminate the flow of power fluid at the delivery end 120 of delivery pipe 118. The complementary, or push-pull, output waves of power fluid from the delivery ends 117 and 120 of the pipes 115 and 118, respectively, may be of any desired wave form, depending on the configuration of wobble plate 121.

Figure 7:
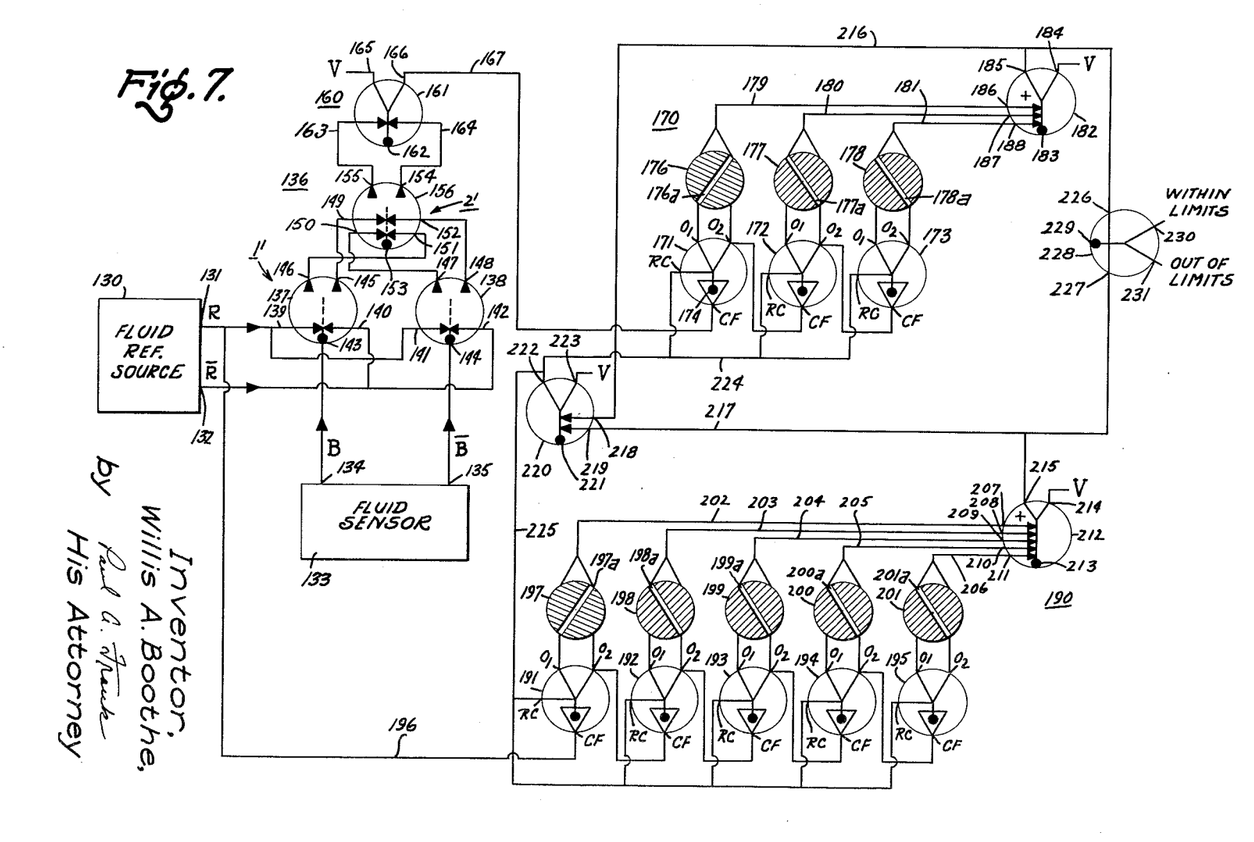
FIGURE 7 is a schematic representation of a fluid-operated error-detecting and indicating circuit of the invention.

In FIGURE 7 there is shown a schematic representation of the fluid-operated error-detecting and indicating circuit of the invention shown previously in block diagram form in FIGURE 1. A fluid reference source 130, corresponding to the fluid reference source 2 of FIGURE 1, provides push-pull, or complementary, output waves R and $\overline{R}$ at the outlet means 131 and 132 thereof, respectively. The fluid reference source 130 is a fluid-operated oscillator provided by the device shown in FIGURE 6 or by other suitable devices. Although the specific form of the fluid reference source 130 forms no portion of this invention, examples of other fluid-operated oscillators suitable for employment in this invention are shown in the copending application entitled, "Fluid-Mechanical Oscillator," of Salvatore Bottone, Serial No. 344,500, filed February 12, 1964, and assigned to the assignee of the present invention. The fluid waves R and $\overline{R}$ comprise reference fluid waves having a fixed characteristic, here provided at a fixed frequency, which is chosen to be proportional to, or representative of, the desired value of a selected condition to be monitored by the system.

Fluid sensor 133, corresponding to the fluid sensor 1 of FIGURE 1, comprises a transducer which monitors the selected condition and produces, in response thereto, complementary or push pull output fluid waves B and $\overline{B}$ at its outlet means 134 and 135, respectively. The output fluid waves B and $\overline{B}$ are varied in frequency in an amount to be proportional to, or representative of, the monitored value of the selected condition.

The reference fluid waves R and $\overline{R}$ and the sensor fluid waves B and $\overline{B}$ are applied to a detector means 136, corresponding to the fluid beat frequency detector 5 of FIGURE 1, which generates, in response thereto, an error fluid wave of a variable characteristic proportional to, or representative of, the difference between the desired and monitored values of the selected condition. Although the specific form of the fluid reference source 130 forms no portion of this invention, examples of other fluid-operated oscillators suitable for employment in this invention are shown in the copending application entitled, "Fluid-Mechanical Oscillator," of Salvatore Bottone, Serial No. 344,500, filed February 12, 1964, and assigned to the assignee of the present invention.

In the fluid-operated beat frequency detector 136 there are employed first and second analogue fluid amplifiers 137 and 138 comprising a first stage 1' of the detector 136 and a third analogue fluid amplifier 156 comprising a second stage 2' of detector 136. The reference fluid waves R and $\overline{R}$ are applied, respectively, to the first and second control fluid inlets 139 and 140 of the fluid amplifier 137 and to the first and second control fluid inlets 141 and 142 of the fluid amplifier 138. Similarly, the sensor fluid waves B and $\overline{B}$ are applied to the power fluid inlets 143 and 144, respectively, of the fluid amplifiers 137 and 138. Fluid amplifier 137 further includes first and second power fluid outlets 145 and 146 and fluid amplifier 138 further includes first and second power fluid outlets 147 and 148.

The third fluid amplifier 156 comprising the stage 2' of the beat frequency detector 136, includes a first pair of control fluid inlets 149 and 150 and a second pair of control fluid inlets 151 and 152. The first pair of control fluid inlets 149 and 150 communicate with the first power fluid outlets 145 and 147 of the fluid amplifiers 137 and 138, respectively, of stage 1' to receive the flow of power fluid therefrom as a flow of control fluid in stage 2'. Similarly, the control fluid inlets 151 and 152 communicate with the second power fluid outlets 146 and 148 of the fluid amplifiers 137 and 138 of stage 1' to receive the flow of power fluid therefrom as a flow of control fluid in stage 2'. The fluid amplifier 156 further includes a power fluid inlet 153 and first and second power fluid outlets 154 and 155. Fluid amplifiers 137 and 138 may be constructed in accordance with FIGURE 2, and fluid amplifier 156 would have a similar construction but with provision for two additional control fluid inlets.

The operation of the beat frequency detector 136 may be expressed by basic relay logic in accordance with the following equations:

$$P_o = (R \cdot B) + (\overline{R} \cdot \overline{B}) \quad (1)$$

$$\overline{P}_o = (\overline{R} \cdot B) + (R \cdot \overline{B}) \quad (2)$$

In the above equations, the dot sign ( · ) indicates the logic AND function, and the plus sign (+) indicates the logic OR function, the parenthetical groupings of the AND functions of R, B, $\overline{R}$ and $\overline{B}$, indicating the non distributive character of the logic functions indicated in the equations. The parenthetically grouped AND functions are hereinafter referred to as the terms of Equations 1 and 2. $P_o$ and $\overline{P}_o$ represent, respectively, the push-pull or complementary output waves produced at the power fluid outlets 154 and 155 of the fluid control device 139 of stage 2′. In accordance with standard heterodyning principles, the complementary output fluid waves $P_o$ and $\overline{P}_o$ include, as frequency components therein, the sum frequency and difference frequency of the input fluid waves R and B and their complements $\overline{R}$ and $\overline{B}$.

The various terms of the Equations 1 and 2 represent logic AND functions performed upon the input fluid waves R and B and their complements $\overline{R}$ and $\overline{B}$ in accordance with a predetermined characteristic therein, defined to be a positive cyclic portion of the fluid waves. Illustratively, where the fluid waves R and B comprise wavelengths of square wave pulses, the square wave pulses constitute the positive cyclic portions thereof. The concurrent presence of the predetermined characteristic, defined to be the positive cyclic portion, in both the input waves R and B applied to the control fluid inlet 139 and the power fluid inlet 143 of the analogue fluid amplifier 137 will produce, respectively, a control jet and a power jet therein, the control jet deflecting the power jet to produce a flow of power fluid at power fluid outlet 145, the flow of power fluid manifesting the logic term (R·B). In like fashion, the flows of power fluid at power fluid outlet 146 of the analogue fluid amplifier 137 and at the power fluid outlets 147 and 148 of the analog fluid amplifier 138 are created in response to the concurrent presence of the predetermined characteristics in the respectively associated input fluid waves applied thereto to manifest the logic functions, respectively, ($\overline{R} \cdot B$) and ($\overline{R} \cdot \overline{B}$), and (R·$\overline{B}$).

Due to the interconnection of stages 1′ and 2 of beat frequency detector 136 as hereinbefore set forth, the flows of control fluid received in stage 2′ are in accordance with the flows of power fluid manifesting the logic terms of Equations 1 and 2. The analog fluid amplifier 156 in stage 2′ responds to the flows of control fluid received therein to produce at the first power fluid outlet 154 a flow of power fluid in response to the presence of a control jet at either of the control fluid inlets 149 or 150, thereby manifesting the logic function (R·B)+($\overline{R} \cdot \overline{B}$). Similarly, a flow of power fluid is produced at the second power fluid outlet 155 in response to a flow of control fluid at either of the control fluid inlets 151 and 152, thereby manifesting the logic function ($\overline{R} \cdot B$)+(R·$\overline{B}$). The flows of power fluid in power fluid outlets 154 and 155 will thus be seen clearly to satisfy the functions expressed in Equations 1 and 2 and thereby constitute, respectively, the push-pull complementary output fluid waves $P_o$ and $\overline{P}_o$.

The beat frequency detector 136 has been illustrated as incorporating analogue fluid amplifiers 137 and 138 in the first stage 1′ and an analogue fluid amplifier 156 in the second or output stage 2′ as represented by the dotted line schematically indicating the power jet in each of these devices. In accordance with the foregoing description of analogue fluid control devices, the output fluid waves $P_o$ and $\overline{P}_o$ are analogue or amplitude modulated in their characteristics. These output waves $P_o$ and $\overline{P}_o$ include both the sum frequency and difference frequency of the input waves R and B and their complements $\overline{R}$ and $\overline{B}$. The error detection function, however, requires that the difference frequency only be obtained. There is therefore provided a wave-shaping circuit 160, for generating, in response to $P_o$ and $\overline{P}_o$, output fluid waves of a frequency equal only to the difference frequency component of $P_o$ and $\overline{P}_o$ and of a square wave form, thereby constituting wave trains of square wave pulses.

The wave-shaping circuit 160 employs a digital fluid control device 161 which may be of the type shown in FIGURE 3 having a power fluid inlet 162 and control fluid inlets 163 and 164. The arrows terminating the lines within the digital fluid control device 161 associated with control fluid inlets 163 and 164 indicate that the device 161 is not of a boundary layer effect type but rather requires a continuous application of a control jet to the power jet to maintain the deflection thereof. This operative requirement is essentially met by the amplitude-modulated waves applied to the control fluid inlets which constitute, respectively, the power flows from the push-pull power fluid outlets 154 and 155 of the analogue fluid amplifier 156 of the beat frequency detector 136. There will thus be created at the power fluid outlets 165 and 166 of the digital fluid control device 161 output fluid waves comprising wave trains of square wave pulses having a frequency equal to the difference frequency of the input waves R and B and their complements $\overline{R}$ and $\overline{B}$, as initially established in the fluid waves $P_o$ and $\overline{P}_o$.

Fluid pulse counters 170 and 190, corresponding to the fluid preset counters 9 and 7 of FIGURE 1, respectively, each constitute a number of stages of binary flip-flop fluid control devices of the variety shown in FIGURE 5. Illustratively, the binary flip-flop fluid control devices 171–173 of the fluid counter 170, and the binary flip-flop fluid control devices 191–195 of the fluid counter 190 each include a control fluid inlet CF, which is the equivalent of the control fluid inlet 81 of the device in FIGURE 5, a reset control fluid inlet RC, which is the equivalent of the control fluid inlet 94 of the device of FIGURE 5 and first and second power fluid outlets $O_1$ and $O_2$ which are the equivalents of the power fluid outlets provided by the power flow passages 99 and 100, respectively, of the device of FIGURE 5.

In both the binary fluid counters 170 and 190, the second power fluid outlet $O_2$ of each stage, with the exception of the last stage, is connected to the control fluid inlet CF of the succeeding stage whereby each of the counters 170 and 190 performs a counting function in a binary fashion with respect to successive pulses applied to the control fluid inlet CF of the first stage.

Illustratively, supposing a reset control pulse to be applied to the reset control inlets RC of each of the binary flip-flop fluid control devices 171–173 of binary fluid counter 170, the various stages thereof are preset to an initial position creating a flow of power fluid at the second power fluid outlets $O_2$ thereof. The first pulse applied to the control fluid inlet CF of the first stage will switch the flow of power fluid to the first power fluid outlet $O_1$ of the device 171. The second pulse will switch the flow of power fluid back to the second power fluid outlet $O_2$. Upon this latter switching, the fluid pulse derived at the second power fluid outlet $O_2$ of the first stage is communicated and applied to the control fluid inlet CF of the second stage constituting the device 172. Thus, it is apparent that in any given stage of the fluid counter 170, or of the fluid counter 190 which operates in an identical fashion, an output pulse is derived for application to the next succeeding stage only in response to the application to the given stage of the two pulses.

Associated with the binary flip-flop fluid control devices 171–173 of fluid counter 170 are valve members 176 to 178, respectively, the latter respectively including conduits 176a to 178a for communicating between a selected one of the power fluid outlets $O_1$ and $O_2$ of the associated stage and a corresponding one of the delivery conduits 179–181. Valves 197–201 including conduits 197a to 201a, respectively, are provided for communicating between a selected one of the power fluid outlets $O_1$ and $O_2$ of the binary flip-flop fluid control devices 191 to 195 of the counter 190 and an associated one of the delivery conduits 202 to 206.

Binary fluid counter 170 further includes an output fluid control device 182 of the digital monostable variety shown in FIGURE 4. The device 182 includes a power fluid inlet 183 and first and second power fluid outlets 184 and 185, the power jet normally being deflected for creating a flow of power fluid at power fluid outlet 185. The device 182 further includes a plurality of control fluid inlets 186–188 to which the delivery conduits 179–181 are connected, respectively. As indicated by the arrow heads associated with the control fluid inlets 186–188, upon receipt of a continuous flow of control fluid at any one or more of the control fluid inlets 186–188, there will be formed a control jet effective to deflect the power jet for providing the flow of power fluid at the power fluid outlet 184, this latter flow being vented to the atmosphere or returned to a pressurized fluid source.

As indicated by the plus sign, the device 182 performs a logic OR function, only one control jet being required for effecting the deflection of the power jet from its normal position; in the absence of all control jets, however, the power jet will revert to its normal position of deflection for providing the flow of power fluid at power fluid outlet 185. For the positions of the valves 176–178 indicated, the total absence of a flow of control fluid in delivery conduits 179–181 will be effected only in the instance that the flow of power fluid is provided at the second power fluid outlet $O_2$ of the first stage and at the first power fluid outlets $O_1$ of the second and all succeeding stages.

Binary fluid counter 190 is provided, in similar fashion, with an output fluid control device 212 of the monostable digital fluid control variety performing the logic OR function as indicated schematically by the plus sign. The output device 212 includes a plurality of control fluid inlets 207–211, to which the delivery conduits 202–206, respectively, are connected, a power fluid inlet 213, and first and second power fluid outlets 214 and 215. The output device 212 operates in an identical manner to the output device 182 of fluid counter 170, producing an output flow of power fluid at power fluid outlet 215 only in the total absence of flows of control fluid in delivery conduits 202–206, in accordance with the logic OR function. For the positions of conduits 197a to 201a of the valves 197–201, respectively, shown, this condition is met for a count in which the flow of power fluid is created at the second power fluid outlet $O_2$ of the first stage and at the first power fluid outlet $O_1$ of the second and all succeeding stages.

The second power fluid outlets 185 and 215 of the output control devices 182 and 212, respectively, are applied through conduits 216 and 217 to the control fluid inlets 218 and 219, respectively, of a reset fluid control device 220, the latter corresponding to the fluid reset gate 13 of FIGURE 1. The reset fluid control device 220 is of the digital variety, indicated schematically by the solid lines representing the power jet flow. The power jet is normally deflected for providing a flow of power fluid at power fluid outlet 223, this flow being vented to the atmosphere or returned to a pressurized fluid source. The power jet is deflected, in response to a flow of fluid at either control fluid inlet 218 or 219, for providing a flow of power fluid at power fluid outlet 222. This latter flow is supplied as a fluid pulse through line 224 to the reset control fluid inlets RC of the stages of fluid counter 170 and through line 225 to the reset control fluid inlets RC of the stages of fluid counter 190. The conduits 216 and 217 further communicate with the control fluid inlets 226 and 227 of a status indicating fluid control device 228, the latter corresponding to the fluid status indicator 10 of FIGURE 1 and including a power fluid inlet 229 and first and second power fluid outlets 230 and 231. As indicated by the solid lines representing the power jet flow, and the absence of arrows associated with the lines communicating with the control fluid inlets 226 and 227, the status indicating fluid control device 228 is of a digital boundary layer effect variety.

In operation, reset fluid control device 220 is initially operated to produce an output power pulse at the second power fluid outlet 222 thereof for establishing an initial position of deflection of the power jets in each stage of the binary counters 170 and 190 for uniformly providing a flow of power fluid at the second power flow outlets $O_2$ thereof. The error fluid wave constituting a wave train of square wave pulses from the beat frequency detector 136 and its associated wave-shaping circuit 160 are applied through line 167 to the control fluid inlet CF of the first stage, comprising the binary flip-flop fluid control device 171 of fluid counter 170. Simultaneously, the reference fluid wave R constituting preferably a wave train of square wave pulses, is applied through line 196 from the first outlet means 131 of fluid reference source 130 to the control fluid inlet CF of the first stage constituting the binary flip-flop fluid control device 191 of fluid counter 190. Since the frequency of the reference fluid wave R is fixed, the period of each cycle of the wave is likewise of a fixed duration; thus, it is apparent that the number of stages which constitute the fluid counter 190 will determine a measuring interval of a predetermined time duration, at the termination of which time an output fluid pulse will be provided at the second power fluid outlet 215 of the outlet fluid control device 212. This output fluid pulse will be communicated through conduit 217 to the control fluid inlet 219 of reset fluid control device 220, the latter providing a flow of power fluid at its power fluid outlet 222. This latter flow of power fluid constitutes a reset control pulse which resets both the fluid counters 170 and 190 for initiating a subsequent measuring interval.

In an identical fashion, when binary fluid counter 170 reaches its predetermined count, an output pulse is produced at the second power fluid outlet 185 of its associated output fluid control means 182 and applied through conduit 216 to control fluid inlet 218 of the reset fluid control device 220. Again, the reset fluid control device 220 responds to produce a reset fluid control pulse for resetting both the fluid counters 170 and 190 for initiating operation thereof in a subsequent measuring interval.

Having selected the number of stages of the fluid counters 170 and 190 for the desired accuracy, it will be apparent that the production of an output pulse from counter 170 prior to one from counter 190 is representative of a detection of an error magnitude exceeding the permissible error limits. The permissible error limits are therefore defined by the predetermined count of the fluid counter 170, which predetermined count cannot occur prior to the completion of the measuring interval determined by the time duration in which fluid counter 190 reaches its predetermined count.

Thus, should the magnitude of the error exceed the permissible error limits, fluid counter 170 will generate an output pulse at the second power fluid outlet 185 of the output fluid control device 182. This output pulse will be supplied though conduit 216 to the control fluid inlet 226 of the error status indicating fluid control device 228. The fluid pulse at control fluid inlet 226 will effect a flow of power fluid at power fluid outlet 231, indicating the error status as exceeding the permissible error limits within the measuring interval. Alternatively, should the magnitude of the error be within the permissible error limits, the fluid counter 190 will generate an output pulse at the second power fluid outlet 215 of the output fluid control device 212 prior to the generation of the output pulse from fluid counter 170, the output fluid pulse from the counter 190 being supplied through line 217 to control fluid inlet 227. In turn, the error status indicating fluid control device 228 will respond to the fluid pulse at its control fluid inlet 227 to provide a flow of power fluid at its first power fluid outlet 230, thereby indicating the error status to be within the permissible error limits of the measuring interval.

As hereinbefore described, the output fluid pulse from either fluid counter 190 or fluid counter 170, whichever occurs first, will be operative to cause reset fluid control device 220 to generate a reset pulse at its power fluid outlet 222 for resetting all the stages of both fluid counters 170 and 190 and to initiate operation thereof in a subsequent measuring interval. Since the output indicating fluid control device 228 is of the boundary layer effect type, the output indications comprising the flows of power fluid at the power fluid outlets 230 or 231 will be of a continuous nature, both during the resetting of the counters 170 and 190 and during subsequent output pulses therefrom when such output pulses are from the same counter as preceding pulses. Thus, only when the error status switches from within to without or from without to within the permissible error limits will there be a change in the output fluid waves from the error status indicating fluid control device 228.

It will, of course, be apparent that the number of stages employed in either the fluid counter 170 or the fluid counter 190 may be varied to establish both the permissible error limits and the accuracy of the error status indication desired. As has been noted, the entire error-detecting and indicating system may be positioned directly in the region of the selected condition which is to be monitored, the only information being required to be transmitted to a remote position being the presence or absence of a flow of power fluid at the outlets of error status indicating device 228. Thus, attenuation or other disturbances in the error status indicating signals are relatively inconsequential and do not affect in any manner the accuracy of the error indication achieved.

The fluid-operated error-detecting and indicating circuit of my invention thus combines great accuracy and an essentially unlimited life span in operation with extreme versatility and ready adaptability to the monitoring of a selected condition even in the presence of extremely adverse environmental conditions and with low costs both in components and construction and in operation.

Numerous modifications of the fluid-operated error-detecting and indicating circuit of the invention will immediately be apparent to those skilled in the art and thus it is intended by the appended claims to cover all such modifications which fall within the true spirit and scope of the invention.

What I claim as new and desire to secure by Letters Patent of the United States is:

1. A fluid-operated error-detecting and indicating circuit comprising:
   (a) sensor means for generating a sensor fluid wave of a variable characteristic representing the monitored value of a selected condition,
   (b) reference means for generating a reference fluid wave of a fixed characteristic representing the desired value of the selected condition,
   (c) detector means communicating with said sensor and said reference means and receiving the sensor and reference fluid waves for generating in response thereto an error fluid wave of a variable characteristic representing the difference between the desired and the monitored values of the selected condition,
   (d) first fluid control means in communication with said reference means for establishing a measuring interval of permissible error limits, said first fluid control means responding to the reference fluid wave to determine the measuring interval and producing an output fluid pulse upon termination of the measuring interval,
   (e) second fluid control means in communication with said detector means for establishing the permissible error limits, said second fluid control means responding to the error fluid wave to determine the error magnitude occurring in each measuring interval and producing an output fluid pulse when the error magnitude exceeds the permissible error limits in a given measuring interval,
   (f) interval reset fluid control means communicating with both said first and said second fluid control means and responding to an output fluid pulse from either of said first and said second fluid control means to generate a reset fluid pulse, the reset fluid pulse initiating operation of said first and second fluid control means in a subsequent measuring interval, and
   (g) status indicating fluid control means responsive to an output fluid pulse from said first fluid control means for generating a first output fluid wave representing the error status as within the permissible error limits and responsive to the output fluid pulse from said second fluid control means for generating a second output fluid wave representing the error status as without the permissible error limits.

2. The fluid-operated error-detecting and indicating circuit as recited in claim 1 wherein
   said status indicating fluid control means comprises a digital fluid control device of the boundary layer effect type, whereby the given one of the first and second output fluid waves generated to represent the error status is maintained continuously throughout the time duration of the given measuring interval and all subsequent measuring intervals and is changed only upon a subsequent change in the error status.

3. A fluid-operated error-detecting and indicating circuit comprising:
   (a) sensor means for generating a sensor fluid wave of a variable frequency representing the monitored value of a selected condition,
   (b) reference means for generating a reference fluid wave of a fixed frequency representing the desired value of the selected condition,
   (c) fluid-operated beat frequency detector means communicating with said sensor and said reference means and responding to the sensor and reference fluid waves for generating an error fluid wave having as a frequency component the difference frequency of the sensor and reference fluid waves and representing the difference between the desired and the monitored values of the selected condition,
   (d) a first fluid counter in communication with said reference means for establishing a measuring interval of permissible error limits, said first fluid counter responding to the reference fluid wave to determine the measuring interval and providing an output fluid pulse upon termination of the measuring interval,
   (e) a second fluid counter in communication with said beat frequency detector for establishing the permissible error limits, said second fluid counter responding to the error fluid wave to determine the error magnitude occurring within each measuring interval and providing an output fluid pulse when the error magnitude exceeds the permissible error limits in a given measuring interval,
   (f) interval reset fluid control means communicating with said first and second fluid counters and responding to an output fluid pulse from either of said first and said second fluid counters to generate a reset fluid pulse, the reset fluid pulse initiating operation of said first and second fluid counters in a subsequent measuring interval, and
   (g) status indicating fluid control means responsive to an output fluid pulse from said first fluid counter for generating a first output fluid wave representing the error status as within the permissible error limits and responsive to an output fluid pulse from said second fluid counter for generating a second output fluid wave representing the error status as without the permissible error limits.

4. A fluid-operated error-detecting and indicating circuit as recited in claim 3 where said first and second fluid counters comprise, respectively first and second binary fluid counters.

5. A fluid-operated error-detecting and indicating circuit as recited in claim 4 wherein each of said first and second binary fluid counters comprises a plurality of stages, each of said stages including a binary flip-flop fluid control device.

6. A fluid-operated error-detecting and indicating circuit as recited in claim 3 wherein each of said first and second fluid counters comprises:
   (a) a plurality of stages of binary flip-flop fluid control devices each having a control fluid inlet and first and second power fluid outlets,
   (b) a logic OR fluid control device having a plurality of control fluid inlets equal in number to said plurality of stages, and
   (c) valve means and conduit means associated with each of said stages and providing communication between a selected one of said first and second power fluid outlets of said binary flip-flop fluid control device in each of said stages and a corresponding control fluid inlet of said logic OR fluid control device, said valve means communicating with said first power fluid outlet of said binary flip-flop fluid control device of said first stage and with said second power fluid outlet of said binary flip-flop fluid control devices of all succeeding stages.

7. A fluid-operated error-detecting and indicating circuit as recited in claim 5 wherein
   each of said binary flip-flop fluid control devices includes a reset control fluid inlet and wherein there is further provided means communicating between each of said reset control fluid inlets and said interval reset fluid control means for applying an output fluid pulse from said interval reset fluid control means to each of said binary flip-flop fluid control devices at said reset fluid control inlets thereof for establishing an initial preset position prior to commencing counting in each successive measuring interval.

8. A fluid-operated error-detecting and indicating circuit as recited in claim 3 wherein said beat frequency detector comprises first and second stages of fluid control devices and wherein there are further provided:
   (a) inlet means communicating with said first stage and outlet means communicating with said second stage,
   (b) means for applying to said inlet means the reference fluid wave from said reference means and the sensor fluid wave from said sensor means,
   (c) said first stage generating a flow of power fluid controlled in accordance with the concurrent presence of a predetermined characteristic in said sensor and reference fluid waves,
   (d) interconnecting means for applying the controlled flow of power fluid from said first stage as a flow of control fluid in said second stage in accordance with a desired logic function,
   (e) said second stage generating a flow of power fluid in accordance with the flow of control fluid so provided in said second stage, and
   (f) said outlet means receiving the controlled flow of power fluid from said second stage to provide output fluid waves having as frequency components the sum frequency and difference frequency of the first and second input fluid waves.

9. A fluid-operated error-detecting and indicating circuit as recited in claim 8 wherein there is further provided wave-shaping means communicating with the outlet means of said beat frequency detector to remove the sum frequency component of the output fluid waves.

10. A fluid-operated error-detecting and indicating circuit as recited in claim 9 wherein
   said wave-shaping means comprises a digital fluid control device receiving as flows of control fluid therein the output fluid waves from said beat frequency detector and creating in response thereto flows of power fluid comprising wave trains of square wave pulses of a frequency equal to the difference frequency component of the output fluid waves from said beat frequency detector.

References Cited by the Examiner

Gray et al.: "Fluid Amplifiers," Control Engineering, pages 57–64, February 1964.

LEO SMILOW, *Primary Examiner.*